UNITED STATES PATENT OFFICE.

EMIL FISCHER, OF BERLIN, GERMANY, ASSIGNOR TO C. F. BOEHRINGER & SOEHNE, OF WALDHOF, GERMANY.

ADENIN AND PROCESS OF MAKING SAME.

SPECIFICATION forming part of Letters Patent No. 607,029, dated July 12, 1898.

Application filed December 24, 1897. Serial No. 663,421. (No specimens.)

*To all whom it may concern:*

Be it known that I, EMIL FISCHER, a citizen of the Empire of Germany, residing at Berlin, in the Empire of Germany, have invented certain new and useful Improvements in the Art of Preparing Adenins; and I do hereby declare the following to be a full, clear, and exact description of the invention, such as will enable others skilled in the art to which it appertains to make and use the same.

This invention relates to the art of preparing adenins, under which term I comprise both adenin proper and its alkyl derivatives. Adenin is a compound which was first discovered by Kossel and by him shown to be convertible into hypoxanthin. This base has hitherto been obtained and isolated from beef pancreas and also occurs in tea extract, as has been shown. (See *Berichte*, 23.225.) No method of preparing the same synthetically has hitherto been devised so far as I am aware. Notwithstanding the elaborate researches made subsequent to its discovery by Krüger (see *Zeitschrift für Physiologische Chemie*, Vol. 18, p. 423) its molecular structure was hitherto doubtful, and particularly the experimental proof for its direct relation to uric acid has been wanting. I have now succeeded in conclusively demonstrating this relationship and at the same time in preparing adenin and alkyl derivatives of the same synthetically from uric acid.

The object of my present invention is this synthetical preparation of adenin and alkyl derivatives of the same, and with this object in view my invention consists in the preparation of adenin by the reduction of a 6 amido 2.8 dihalogen purin, and more particularly in the reduction of 6 amido 2.8 dichloro purin or the methyl derivative of the same, whose preparation, structure, and properties have been set forth in my application for Letters Patent of the United States filed November 13, 1897, Serial No. 658,492; and my invention consists in such further features as will be hereinafter set forth, and pointed out in the claims.

The following is a detailed description of the preferred method in which I contemplate carrying out my invention, the proportions being all given by weight.

The starting material from which I prepare the adenin, the 6 amido 2.8 dichloro purin, is described in a paper by me published in *Berichte der Deutschen Chemischen Gesellschaft*, (Vol. 30, p. 2239.)

To prepare the adenin, I take one part of 6 amido 2.8 dichloro purin and introduce it into ten parts of hydriodic acid of the specific gravity 1.96. A sufficient quantity of powdered phosphonium iodid (about one part) is then added and the mixture is shaken for several hours at the ordinary room temperature. The chloro compound after this treatment will have been converted for the most part into adenin or rather its hydriodate—

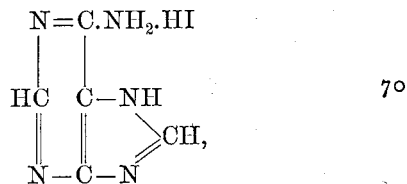

which separates from the solution in the form of faintly-colored crystals. This conversion takes place although there is no complete solution of the ingredients. After the formation of the crystals the mass is heated to the boiling-point until a clear solution results. The solution is then allowed to cool, whereby the hydriodate of adenin is again thrown out. It is separated from the mother-liquor by filtration, and the base is then liberated by adding an alkali, such as ammonia, to a concentrated aqueous solution of the same. The base so obtained is colorless, and after once recrystallizing it from a solution in hot water it is obtained pure. It possesses all the properties of the natural product as obtained by Kossel and as described in *Zeitschrift für Physiologische Chemie,* (Vol. 12, p. 252.) A further amount of the base is obtained from the mother-liquor of the hydriodate by evaporating and treating the residue with ammonia.

From the above method of obtaining the adenin and the known structural formula of 2.6.8 trichloro-purin and 6 amido 2.8 dichloro purin it follows that the structural formula of adenin is—

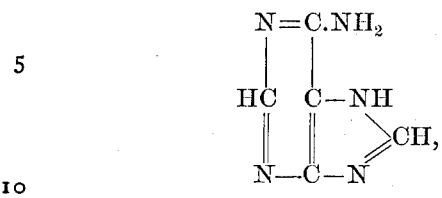

from which it follows that adenin is a 6 amido-purin.

My invention, broadly considered, is also applicable to the production of alkylized adenins, such as the 9 methyl-adenin described by Krüger in *Zeitschrift für Physiologische Chemie*, (Vol. 18, p. 434,) and 7 methyl-adenin, a body first discovered by me, and which is also covered in the claims hereunto annexed. These bodies may be obtained by a reduction of the corresponding alkylized amido-dichloro-purins.

*Production of 9 methyl-adenin.*—This adenin is produced in a manner corresponding to that employed in the production of adenin proper—viz., by the reduction of 9 methyl 6 amido 2.8 dichloro purin. In order to obtain the latter compound, I heat one part of 9 methyl 6 amido 8 oxy 2 chloro purin with thirty parts of phosphorus oxychlorid in a closed vessel to from 140° to 145° centigrade, maintaining this temperature for two hours. The reaction takes place according to the following equation:

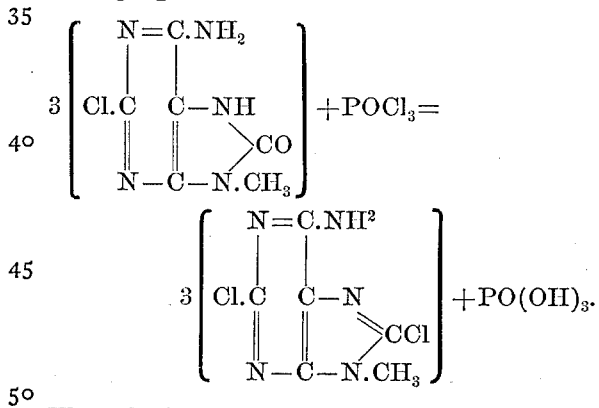

The solution is evaporated *in vacuo*, the residue is warmed with twenty parts of water, and after adding a sufficient quantity of sodium acetate the free base is thrown out. To purify the same, it is shaken with dilute soda-lye, and after filtration the residue is recrystallized from hot alcohol. The base melts at 270° centigrade. The 9 methyl 6 amido 8 oxy 2 chloro purin and its method of manufacture have been described and set forth in my application, Serial No. 658,492, filed November 13, 1897, (No. 11,) and are not herein claimed, being covered in said application. I then reduce the base 9 methyl 6 amido 2.8 dichloro purin by the same method employed for the adenin proper—such, for example, as treating it with hydriodic acid in the manner there set forth. This results in the production of 9 methyl-adenin, according to the equation—

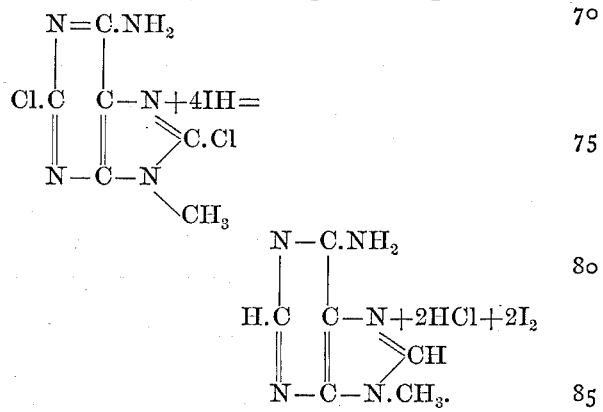

The 9 methyl-adenin so prepared melts at about from 308° to 310° centigrade and possesses all the properties assigned to this base by Krüger in *Zeitschrift für Physiologische Chemie*, (Vol. 18, p. 434.)

*Production of 7 methyl-adenin.*—This body is produced by reduction of 7 methyl 6 amido 2.8 dichloro purin in a manner precisely similar to that indicated in the above examples.

In order to obtain the 7 methyl 6 amido 2.8 dichloro purin, I heat one part of 7 methyl 6 amido 8 oxy 2 chloro purin with thirty parts of phosphorus oxychlorid to from 140° to 145° centigrade in a closed vessel, maintaining this temperature for about two hours. The reaction takes place according to the following equation:

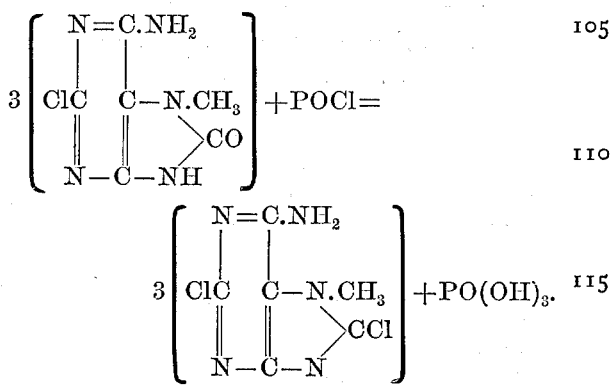

The solution is evaporated *in vacuo*. The residue is then shaken with thirty parts of water, and after adding a sufficient quantity of sodium acetate the free base is thrown out. To purify the same, it is shaken with dilute soda-lye, and after filtration the residue is recrystallized from hot alcohol. The substance has no melting-point, but decomposes at higher temperatures. The 7 methyl 6 amido 8 oxy 2 chloro purin and its method of preparation have been set forth in my application, Serial No. 658,492, filed November 13, 1897, and are not herein claimed, being covered in said application. The base 7 methyl 6 amido 2.8 dichloro purin is then reduced as in the case of the preparation of adenin proper—for example, by treating it with hydriodic acid under the conditions set forth in connection with the adenin proper. This results in the production of 7 methyl-adenin, according to the equation—

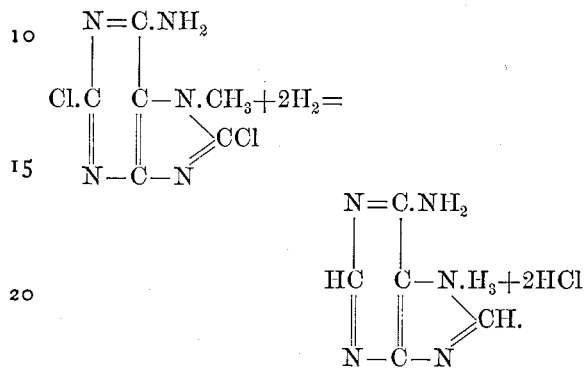

The new compound, 7 methyl-adenin, thus obtained melts at 347°, while assuming a faint brownish tinge. At a still higher temperature it sublimes in part. It dissolves in about twenty-nine parts of boiling water. Its formula is—

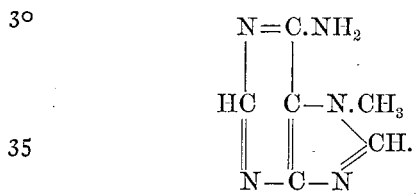

Having thus fully described my invention, what I claim, and desire to secure by Letters Patent of the United States, is—

1. The process which consists in subjecting an amido-halogen-purin or an alkyl derivative of the same to the action of a reducing agent.

2. In the art of preparing adenin, the process which consists in subjecting 6 amido 2.8 dichloro purin to the action of a reducing agent.

3. The process which consists in subjecting 6 amido 2.8 dichloro purin or an alkyl derivative of the same to the action of hydriodic acid and phosphonium iodid, substantially as described.

4. In the art of preparing adenin, the process which consists in agitating 6 amido 2.8 dichloro purin, together with hydriodic acid and phosphonium iodid, in the proportions and at the temperature and for the time, substantially as set forth, then heating the mixture to the boiling-point and until a clear solution results, then filtering and treating with an alkali added to the solution.

5. In the art of preparing adenin, the process which consists in agitating 6 amido 2.8 dichloro purin, together with hydriodic acid and phosphonium iodid, in the proportions and at the temperature and for the time, substantially as set forth, then heating the mixture to the boiling-point and until a clear solution results, then filtering and treating with ammonia added to the solution.

6. As a new chemical compound, 7 methyl-adenin, having the formula hereinabove given, whose melting-point is substantially 347° centigrade, which sublimes in part at a still higher temperature and which dissolves in about twenty-nine parts of boiling water.

In testimony whereof I affix my signature in presence of two witnesses.

EMIL FISCHER.

Witnesses:
CHARLES H. DAY,
HENRY HASPER.